United States Patent [19]

Johnson

[11] Patent Number: 4,892,198

[45] Date of Patent: Jan. 9, 1990

[54] ARTICLE DISPLAY APPARATUS

[76] Inventor: Barry T. Johnson, Meadow Cottage, Normanton on Soar, Loughborough, Leicestershire, England

[21] Appl. No.: 260,924

[22] Filed: Oct. 20, 1988

[30] Foreign Application Priority Data

Oct. 21, 1987 [GB] United Kingdom ............... 8724686

[51] Int. Cl.$^4$ .............................................. A47G 19/08
[52] U.S. Cl. ........................................ 211/41; 211/184
[58] Field of Search .................... 211/41, 71, 184, 40, 211/10; 108/61, 62; 312/15

[56] References Cited

U.S. PATENT DOCUMENTS

| 1,273,894 | 7/1978 | Madison | 211/184 X |
| 2,321,794 | 6/1943 | Braun | 312/10 X |
| 3,160,282 | 12/1964 | Gunn | 211/184 |
| 3,269,558 | 8/1966 | Hess | 211/184 |
| 4,317,603 | 3/1982 | Pepicelli et al. | 211/40 X |
| 4,684,027 | 8/1987 | Wright | 211/40 |

Primary Examiner—Sarah A. Lechok
Attorney, Agent, or Firm—Dellett, Smith-Hill and Bedell

[57] ABSTRACT

An article display shelf, formed from an injection moulded plastics material, has a base (10) with a side wall (12) providing inwardly extending ribs (14). Movable baffles (20) are mounted on the base (10). In one position, the baffles (20) co-operate with the ribs (14) for edgewise display of such as video cassettes, and can be moved through an intermediate position for an angle faced display, to a position for a full faced display. Thus the shelf can adapt to any desired type of display to retain cassettes without danger of collapse.

4 Claims, 1 Drawing Sheet

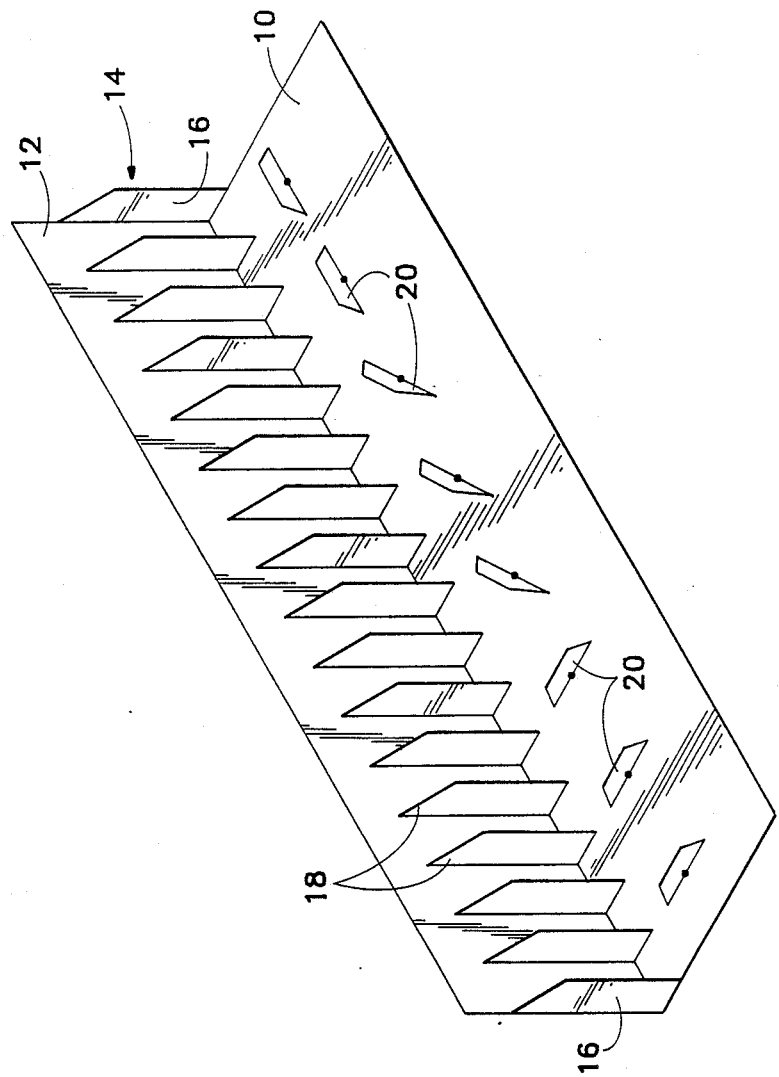

ARTICLE DISPLAY APPARATUS

This invention relates to apparatus for retaining articles for dislay and is particularly concerned with the display of articles such as video cassettes, audio cassettes, compact discs, books and other like articles of generally rectangular configuration. Hereinafter, for ease of description only, the Specification will refer simply to video cassettes.

According to the present invention there is provided apparatus for retaining articles for display, the apparatus comprising a base, article support means to one side of the base, and abutment means adjustably located on the base to be movable between selected positions allowing for retaining articles in different orientations against the support means.

Preferably the support means comprises an upstanding wall on the base provided with a plurality of parallel, inwardly extending ribs so spaced as to allow edgewise location of an article between adjacent ones of the ribs.

Preferably also the abutment means comprises a plurality of movable baffles which are spaced from the ribs towards the other side of the base. The baffles in one position may be aligned with respective alternate ones of the ribs to enable an edgewise display of the articles, the outermost baffles being aligned with the ribs adjacent the outermost ribs. The baffles may be movable to a position at right angles to the ribs to enable a full faced display of the articles through an intermediate position enabling an angled face display of the articles.

An embodiment of the present invention will now be described by way of example only with reference to the single figure of the accompanying drawings which is a perspective view from the front and one end of an apparatus according to the invention.

Referring to the drawing, an apparatus for retaining articles for display in the form of a shelf for displaying video cassettes is preferably formed from an injection moulded plastics material and has a base 10 which is horizontal in use provided with an upstanding wall 12 along one side edge.

A plurality of ribs 14 are provided on the wall 12 to extend a short distance along the base 10, the ribs 14 comprising outermost ribs 16 at respective ends of the wall 12 and intermediate ribs 18 arranged in a parallel equispaced relation along the length of the wall 12, the spacing between adjacent ribs 16,18 enabling edgewise location therein of an article such as a video cassette.

A plurality of movable baffles 20 are provided on the upper surface of the base 10, each of the baffles 20 being movable on a pivot with the pivots being aligned at a location spaced from the free edges of the ribs 16,18. The baffles 20 may be formed of a plastics material and may each have a pin-like extension on a lower edge, the extension having a neck whereby to be a push fit into a respective hole in the base 10 until the latter locates in the neck. The baffle 20 is thereby pivotally located. Alternatively, a separate pivoting arrangement may be provided.

The baffles can locate in a first position wherein the plane of the baffle is aligned with the plane of a respective one of the ribs 18, one of the baffles 20 being associated with each of the ribs 18 adjacent the outermost ribs 16, and associated with each other alternate rib 18. In their first position, as shown by the three baffles 20 to the left hand end of the shelf in the drawing, the baffles 20 enable edgewise display of the video cassettes in the normal manner with a pair of cassettes between adjacent ones of the baffles 20 in abutment therewith.

The baffles 20 are movable through 90° to the position shown by the two baffles at the right hand end of the shelf in the drawing, in which position the cassettes can be located with one side face against the outer ends of the ribs 14, the baffles 20 abutting the opposite side faces which are displayed, thereby retaining the cassettes in a full faced display. It is envisaged that the cassettes may be displayed in this position by having their display faces locating over the tops of the baffles 20, the ends of the cassette being generally recessed relative to the display faces whereby the cassettes will be retained in position.

In an intermediate position as shown by the intermediate baffles of the display shelf of the drawing, the cassettes can locate at an angle between adjacent ones of the baffles 20 and be positioned against respective ones of the ribs 14 whereby to be retained by abutment with the baffles 20 in an angle faced display.

The display shelf thereby can adjust to suit any desired display depending on the number of video cassettes which are required to be displayed, the cassettes in any type of display being retained in a supported condition to prevent the collapse which often occurs with a domino effect. The shelf is therefore very versatile and the one design of shelf can be used for different types of displays at any one location. This can be of considerable advantage to the retailer who is not then required to purchase different designs of shelf to retain in stock for use as and when necessary.

It is to be appreciated that, as previously indicated, the invention is not restricted to use with video cassettes, but can be used with any other suitable articles such as audio cassettes, compact discs, books and other forms of stationery. It is also to be appreciated that various modifications may be made without departing from the invention. For example the dimensions and spacing of the ribs and the baffles may be varied to suit the articles to be supported and may be of different configuration from the arrangement described and shown. Also the display shelf can be made of any other suitable materials.

I claim:

1. Apparatus for retaining articles for display, the apparatus comprising a base, an upstanding wall on one side of the base provided with a plurality of parallel, inwardly extending fixed ribs so spaced as to allow edgewise location of an article between adjacent ones of the ribs, and a plurality of abutment members which are spaced from the ribs towards the other side of the base, the abutment members being mounted on the base for movement between one position, wherein the abutment members are aligned with respective alternate ones of the ribs to enable an edgewise display of the articles, and a position at right angles to the ribs to enable a full faced display of the articles, through an intermediate position enabling an angled face display of the articles.

2. Apparatus according to claim 1, wherein the outermost abutment members are aligned with the ribs adjacent the outermost ribs.

3. Apparatus according to claim 1, wherein each abutment member is pivotally mounted on the base.

4. Apparatus according to claim 1, wherein the apparatus is formed from an injection moulded plastics material.

* * * * *